United States Patent
Haumont

(10) Patent No.: US 7,802,011 B2
(45) Date of Patent: Sep. 21, 2010

(54) MAPPING OF PACKETS TO PDP CONTEXTS IN MULTISESSION CONNECTION

(75) Inventor: Serge Haumont, Helsinki (FI)

(73) Assignee: Nokia Corporation, Espoo (FI)

(*) Notice: Subject to any disclaimer, the term of this patent is extended or adjusted under 35 U.S.C. 154(b) by 995 days.

(21) Appl. No.: 10/480,440

(22) PCT Filed: Jun. 15, 2001

(86) PCT No.: PCT/EP01/06787

§ 371 (c)(1),
(2), (4) Date: Feb. 6, 2004

(87) PCT Pub. No.: WO02/104046

PCT Pub. Date: Dec. 27, 2002

(65) Prior Publication Data

US 2004/0153551 A1    Aug. 5, 2004

(51) Int. Cl.
*G06F 15/16* (2006.01)
*H04L 12/66* (2006.01)

(52) U.S. Cl. .................. 709/238; 709/224; 709/227; 370/352

(58) Field of Classification Search ............ 709/228, 709/238, 224, 227; 370/230.1, 352, 401
See application file for complete search history.

(56) References Cited

U.S. PATENT DOCUMENTS

2002/0036983 A1*   3/2002   Widegren et al. ........... 370/352

2003/0039237 A1*   2/2003   Forslow ..................... 370/352

FOREIGN PATENT DOCUMENTS

| EP | 0 818 907 A2 | 1/1998 |
|---|---|---|
| WO | WO 99/05828 | 2/1999 |
| WO | WO 99/16266 | 4/1999 |

OTHER PUBLICATIONS

"*3rd Generation Partnership Project; Technical Specification Group Services and System Aspects; QoS Concept and Architecture* (3G TS 23.107 version 3.0.0 )"; 3G TS 23.107 v3.0.0 (Oct. 1999), pp. 1-32.
*3rd Generation Partnership Project; Technical Specification Group Services and System Aspects; Digital cellular telecommunications system* (Phase 2+); *General Packet Radio Service (GPRS); Service Description; Stage 2* (3G TS 23.060 version 3.2.0) 3G TS 23.060 DRAFT v3.2.0 (Dec. 1999), pp. 1-173.
Blake, et al., "*An Architecture for Differentiated Services*", Network Working Group Dec. 1998 pp. 1-36.
"*Can You Build a Smart Network with Dumb NIC'S?*", Data Communications on the Web, Apr. 21, 1998, pp. 1-9.

* cited by examiner

*Primary Examiner*—Jungwon Chang
(74) *Attorney, Agent, or Firm*—Mintz, Levin, Cohn, Ferris, Glovsky and Popeo, P.C.

(57) ABSTRACT

Routing packets belonging to different quality of service flows in a packet data network system is described. For each application initiated by a subscriber equipment with an associated quality of service flow in a multi-session connection settings of a network node hosting the application are obtained. From the obtained settings configuration information are determined and packets are routed from the network system to the subscriber equipment for each initiated application in accordance with the configuration information.

28 Claims, 4 Drawing Sheets

PRIOR ART  Fig. 1

MAPPING OF PACKETS TO PDP CONTEXTS IN MULTISESSION CONNECTION

FIELD OF THE INVENTION

The present invention relates to the dynamic configuration of a user equipment or the applications inside the user equipment capable of connecting to a variety of external networks (e.g. Internet, Intranet) through an access technology supporting multiple QoS flows. The invention is particularly relevant for the mapping of data packets to PDP contexts for GPRS (General Packet Radio Service) subscribers having multiple sessions and applications active simultaneously.

BACKGROUND OF THE INVENTION

Typical networks such as an Internet network may be accessed through a variety of ways (GPRS, WLAN, ADSL modem, etc.). In addition, many access technologies support multiple QoS flows (GPRS, ADSL, RSVP, etc.). For the same time, the same user equipment is often used to access different networks. A typical illustration is a GPRS network where a user equipment may be connected to the Internet or an Intranet using different Access Points. GPRS is the packet technology used in GSM and in UMTS (using WCDMA (Wideband Code Division Multiple Access)radio)). In GPRS, each QoS flow is associated to a PDP context (logical connection from user equipment to external network).

In a PDP (Packet Data Protocol) Context Activation Procedure as shown in FIG. 1, an MS (Mobile Station) sends an Activate PDP Context Request message comprising PDP Type, PDP Address, APN (Access Point Name) and QoS (Quality of Service) Requested to an SGSN (Serving GPRS Support Node) in a PLMN (Public Land Mobile Network). QoS Requested indicates the desired QoS profile. The SGSN validates the Activate PDP Context Request optionally using PDP Type, PDP Address and APN.

If a GGSN (Gateway GPRS Support Node) address can be derived, the SGSN sends a Create PDP Context Request message comprising PDP Type, PDP Address, APN and QoS Negotiated to the affected GGSN. The GGSN may use the APN to find an external network. A Selection Mode indicates whether a subscribed APN was selected, or whether a non-subscribed APN sent by the MS or a non-subscribed APN chosen by the SGSN was selected. The GGSN may use the Selection Mode when deciding whether to accept or reject the PDP context activation. For example, if an APN requires subscription, then the GGSN is configured to accept only the PDP context activation that requests a subscribed APN as indicated by the SGSN with Selection Mode. The GGSN creates a new entry in its PDP context table and creates a Charging Id. The new entry allows the GGSN to route PDP PDUs (Packet Data Units) between the SGSN and the external PDP network and to start charging. The GGSN returns a Create PDP Context Response message comprising PDP Address, QoS Negotiated and Charging ID to the SGSN.

If QoS Negotiated received from the SGSN is incompatible with the PDP context being activated, then the GGSN rejects the Create PDP Context Request message.

The SGSN returns an Activate PDP Context Accept message to the MS. The SGSN is now able to route PDP PDUs between the GGSN and the MS and to start charging.

GPRS can support different QoS flows, each corresponding to a PDP context, for a unique PDP address (e.g. Ipv4 or Ipv6 address). In 3GPP Release 99 the QoS mechanism uses a set of filters called Traffic Flow Template (TFT) and information in the IP header, such as Type of Service (ToS) field or UDP (User Datagram Protocol) port number in order to determine to which PDP context an IP packet belongs.

The MS maps uplink packets to the proper PDP context, and GGSN maps downlink packets to the proper PDP context using TFT. It is to be noted that the MS configures the GGSN TFT.

While such QoS mechanism allows to differentiate traffic, it may not always be easy to use for various reasons:
  applications do not always use fixed port numbers,
  end-to-end encryption may render the UDP port number inaccessible for the GGSN,
  ToS values are selected by the operator, so an application may have different ToS values in different networks, and/or
  ToS values may be changed by edge routers at the point of interconnection between two ISPs (Internet Service Providers).

A typical application example is an H323 call. Relying on the port number is not useful since some H323 family protocols e.g. H245 use dynamic port. Using the port number will be just impossible if encryption is used.

Usually, the end point of an IP connection of the user equipment is a server in an IP network, which is controlled by the operator of the IP network, for example a Call Server, or the end point is a server in the Internet or Intranet, which is not controlled by the IP network operator. However, communication may also be established between two user equipments (e.g. VOIP call), connected through different operators' networks.

Hence, the general problem is how to properly configure QoS for applications which may connect through different access and to different networks, in particular, the QoS parameters used by the access technology, the filter used to select the proper QoS flow, and QoS parameters (e.g. ToS) used in the network where the connection is established. An additional problem is how to set filters for applications which do not use fixed port number, or for which the port number cannot be read due to encryption. A further problem is that ToS setting is most often proprietary.

SUMMARY OF THE INVENTION

It is therefore an object of the present invention to solve the above-mentioned problems and to provide QoS related configuration for every application even if encryption is used.

According to the present invention, a packet data network system for routing packets belonging to different quality of service flows comprises a subscriber equipment for initiating applications with associated quality of service flows in a multi-session connection. The subscriber equipment may comprise a laptop or the like and a "modem" or access device (e.g. ADSL modem or mobile station) for transmitting data packets to a packet data network like an operator IP network. The subscriber equipment may also integrate application and modem in the same device such as a Nokia communicator.

It is important to distinguish two cases:
  the application is tightly integrated to the access technology, so that it can indicate the QoS needed and the QoS flow that it should use. This is typically but not necessarily the case of an integrated device.
  the application is not tightly integrated to the access technology, so that it may indicate the QoS needed using generic API, and cannot directly identify the QoS flow that is should use. Instead the modem needs to map the traffic received from different applications to different QoS flows using its own filters. This is typically but not necessarily the case of a separated device.

The system further comprises a configuration device like a configuration server (e.g. policy server) which may be located in the operator IP network. The configuration device obtains, for each initiated application, type of service information of a network node hosting the application, such as an operator application server, media gateway, H323 gatekeeper, laptop, etc. Then, the configuration device provides the configuration information to the subscriber equipment. This information is derived from the obtained type of service information and possibly from the operator policy. This information includes QoS parameter defining QoS flow (e.g. GPRS QoS profile), filters for uplink and downlink (e.g. TFT), and parameters to be used by the application (ToS or port number).

The system further comprises a gateway node, like a GGSN, connecting the access technology to the operator IP network, for exchanging packets between the network and the subscriber equipment. This gateway should select the proper QoS flow for each application using filters using for example ToS field of incoming packets. The subscriber equipment uses the obtained configuration information to set the filters and the associated quality of service flow in the gateway node. The gateway node is able to route the packets into the proper QoS flow on the basis of the filter set by the user equipment and the packet header (e.g. ToS field). It should be noted that the User equipment sets the filter in the gateway node because if dynamic configuration is not used, the application in the user equipment is the only entity capable of properly setting the filter. This is the case in GPRS where MS sets TFT. It is assumed that the same generic mechanism is kept with dynamic configuration, so that filters of the gateway node are set by the user equipment.

The type of service information (or other field used by the filter) marked in the packets sent by an application may be determined by an operator of the network hosting this application. In a preferred embodiment, this ToS is set by the same configuration device into the various applications. In this case the configuration device obtains these parameters directly. If the application is located in a different network connected through an edge router capable of changing the type of service information of the IP packets, the same configuration device may configure the edge router and obtain type of service used by the application in the other network. The configuration device will then know with what type of service information the packet will be marked which belongs to a certain application arriving at the gateway node.

If the configuration device cannot configure the parameters set by the application directly (e.g. the application is not implementing dynamic configuration), the configuration device may further obtain settings, such as Type of Service (ToS) information (i.e. DiffServ codepoints), of the application(s) in the subscriber equipment and provide to the subscriber equipment the configuration information. This configuration information is preferably filters based on the type of service information and appropriate QoS parameters. This is illustrated in FIG. 2, where when knowing the settings of the application and the operator policy (here Netscape and Q931 use interactive class, Email uses background class and UDP/RTP uses conversational class), the configuration device can indicate the proper filters to the subscriber equipment (e.g. Mobile station). The subscriber equipment then uses the ToS field of the IP packets coming from an application and the filter to map this uplink packet into the appropriate QoS flow (e.g. PDP context). The subscriber equipment transmits packets to the network for each initiated application in accordance with the associated quality of service flow mapped in the subscriber equipment.

Further, in order to properly configure the Gateway (e.g. GGSN), the subscriber equipment may need to know the mapping for downlink. This set of filters (e.g. TFT) is first sent from the configuration device to the subscriber equipment and then from the subscriber equipment to the gateway. The gateway is then able to transmit every downlink packet into the right QoS flow.

The configuration device may further obtain setting information in a variety of ways:

First, settings are often very static. For example, a certain type of application uses a fixed UDP port. Some other application may always use same ToS information. In such case, the settings information is just public knowledge.

In a second embodiment, the application may have configurable settings. In this case, the operator may be able to provide this configuration to the user. He may pre-configure it before selling the application to the user, or he may use remote configuration, or he may have an agreement with the Information Management (IM) department of a corporate who will install proper settings. This last case assumes that the corporate has a special agreement with the operator.

The present invention presents a method for dynamically configuring a user equipment and an application in the user equipment, so that packet traffic of the application is sent through proper QoS flow using appropriate QoS parameters. Packets are routed in the proper QoS flow using filters. These filters use information contained in the packet header such as ToS information for mapping packets to associated QoS flows (e.g. PDP contexts). Thus, the level of QoS needed by an application is provided. The present invention provides means for configuring uplink and downlink filters and their associated QoS flow for every application or protocol used by a user equipment.

In the following the present invention will be described by way of preferred embodiments thereof with reference to the accompanying drawings.

DESCRIPTION OF THE PREFERRED EMBODIMENTS

Figure 1:
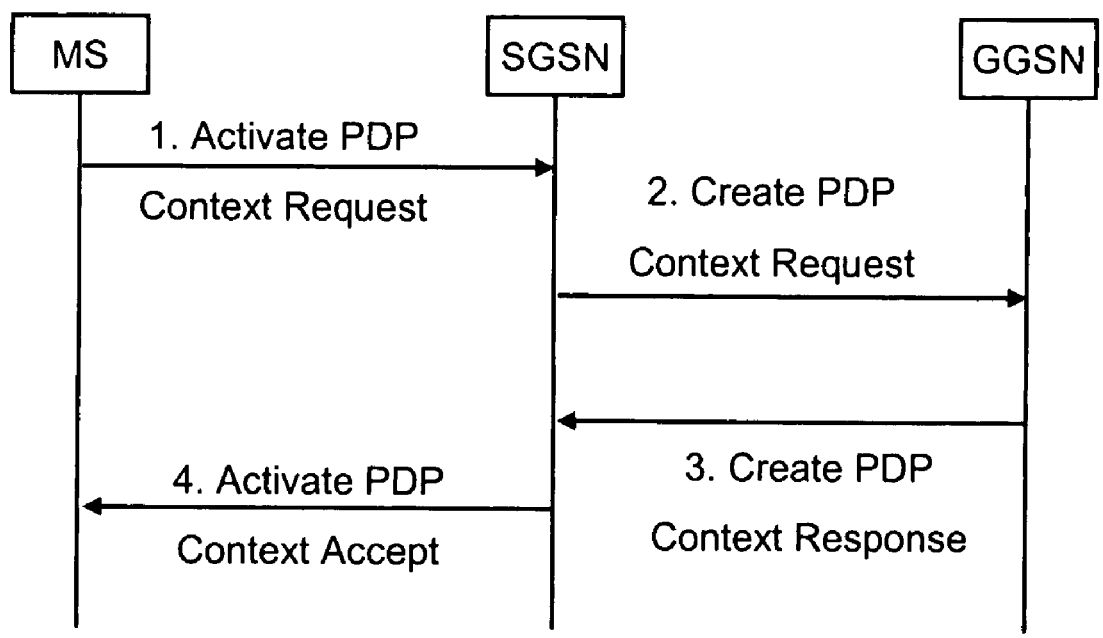
FIG. 1 shows a PDP Context Activation Procedure.
Figure 2:
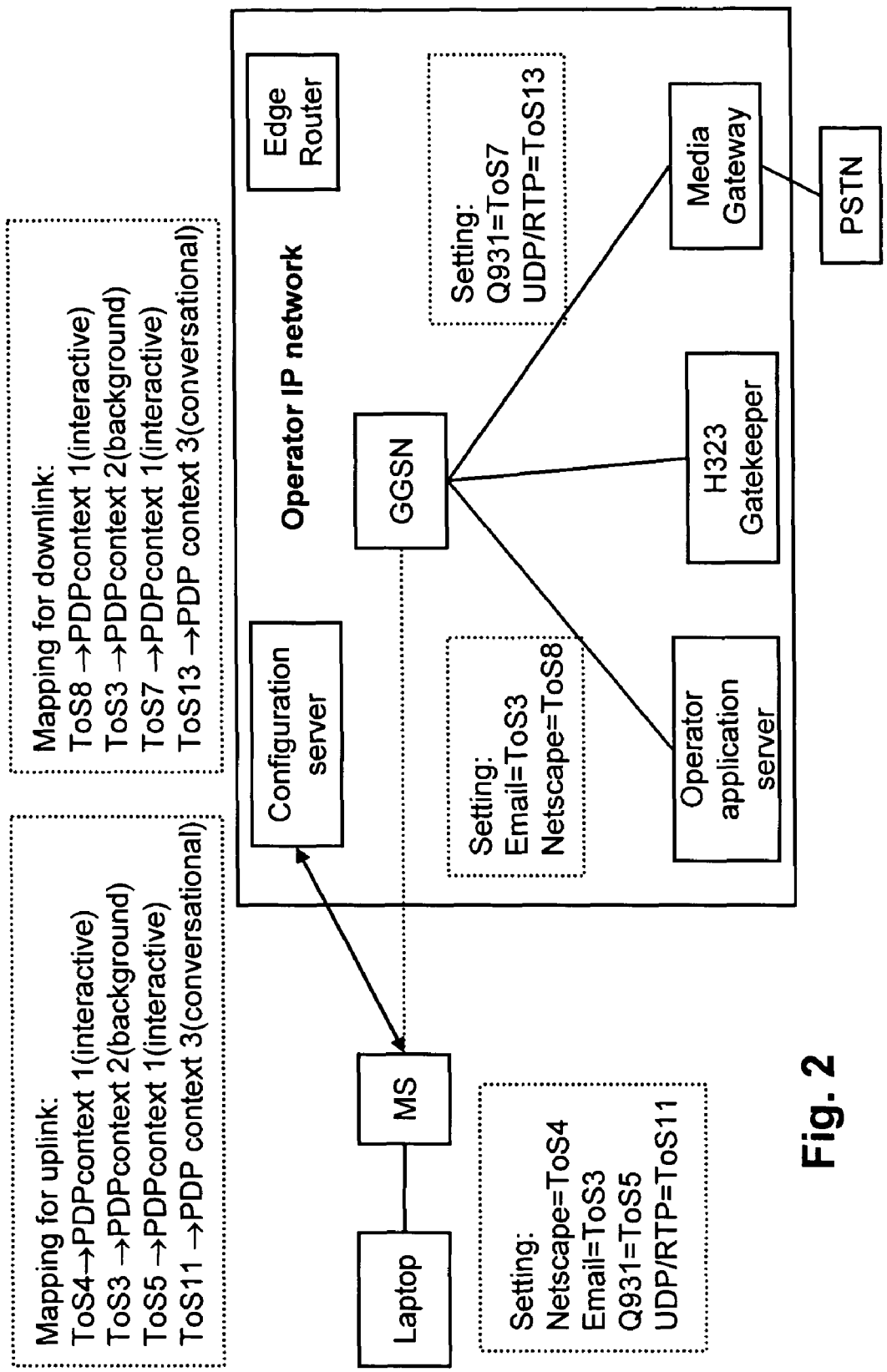
FIG. 2 shows a schematic block diagram of a network system comprising a configuration server according to the present invention.

FIG. 2 shows a network system according to GPRS. A Mobile Station (MS) to which a laptop can be connected can initiate multiple sessions in order to use applications or protocols hosted in an operator IP network by an operator application server, a media gateway and/or an H323 gatekeeper, for example. For each session a PDP context with a requested QoS is activated by the MS in an SGSN (not shown) towards a GGSN in the operator IP network. The GGSN then has to map downlink packets belonging to the different applications or protocols to the proper PDP contexts or QoS flows.

According to the present invention, a dedicated, network-specific configuration server keeps track of the ToS settings of applications hosted within the network system.

According to an embodiment of the present invention, the configuration server knows how the laptop sets the ToS bits for every application. The configuration server obtains its knowledge from the corporate IT (Information Technology) staff, or from the software the operator provides to the user (preferably remotely). In case of a communicator like integrated MS, the operator knows the ToS setting from the mobile type or manufacturer and provides the knowledge to the configuration server.

According to another embodiment, the operator may be able to configure the mobile setting, i.e. the mapping between the application and the ToS bits. This could be done by using a default standard or an agreed standard.

The configuration server is provided with the ToS information of the applications hosted in the operator network. For example, the configuration server knows how the application server sets the ToS bits. This is a straightforward configuration if the application server is owned by the operator or an operator partner. The setting may also be known if the application server is set up by corporate staff and the operator has an agreement with the corporate. A particular important application server is a Call Server which is foreseen to be managed by the operator. The knowledge about the setting may also be derived from default standard or agreed standard.

When the subscriber initiates a session in order to use an application hosted in the operator IP network shown in FIG. 2, the configuration server of this IP network provides the MS with ToS information of the application in order to inform the MS how it should configure its own TFT and the GGSN TFT. The operator may use MExE (Mobile application Execution Environment) to update MS configuration, i.e. mapping of ToS to PDP context. When the MS configures the TFT to be used in the GGSN for that session it is able to specify the correct ToS information and the GGSN can use the ToS information when routing packets to several simultaneous sessions of the same subscriber.

Alternatively, the ToS information may be initially delivered from the configuration server to the MS over a single-session connection from the subscriber to the application when it is self-evident to the GGSN which PDP context to use.

In case there are EDGE routers that interfere with ToS information being passed, the configuration server application needs to be aware of the nature of the interference and be able to counteract this interference. In case of an operator's own edge router its behaviour can easily be known and counteracted by the configuration server.

FIG. 2 shows an example of ToS settings and PDP context mappings. The configuration server knows the ToS settings of the laptop for Netscape (=ToS4), Email (=ToS3), Q931 (=ToS5) and User Datagram Protocol(UDP)/Real Time Protocol (RTP) (=ToS11) and provides these ToS settings to the MS and informs the MS how to configure its TFT, i.e. how to map the uplink ToS to PDP context. As shown in FIG. 2, the MS maps ToS4 to PDP context 1 (interactive), ToS3 to PDP context 2 (background), ToS5 to PDP context 1 (interactive) and ToS11 to PDP context 3 (conversational).

Moreover, the configuration server knows the ToS settings of the operator application server (Netscape=ToS8, Email=ToS3) and the media gateway (Q931=ToS7, UDP/RTP=ToS13), which host the initiated applications. The configuration server provides these settings to the MS and informs the MS how to configure the GGSN TFT, i.e. how to map the downlink ToS to PDP context. The MS configures the GGSN TFT accordingly, so that the GGSN maps ToS3 to PDP context 2, ToS8 to PDP context 1, ToS13 to PDP context 3 and ToS7 to PDP context 1. Hence, the downlink packets are mapped by the GGSN to the same PDP context as the corresponding uplink packets.

Figure 3:
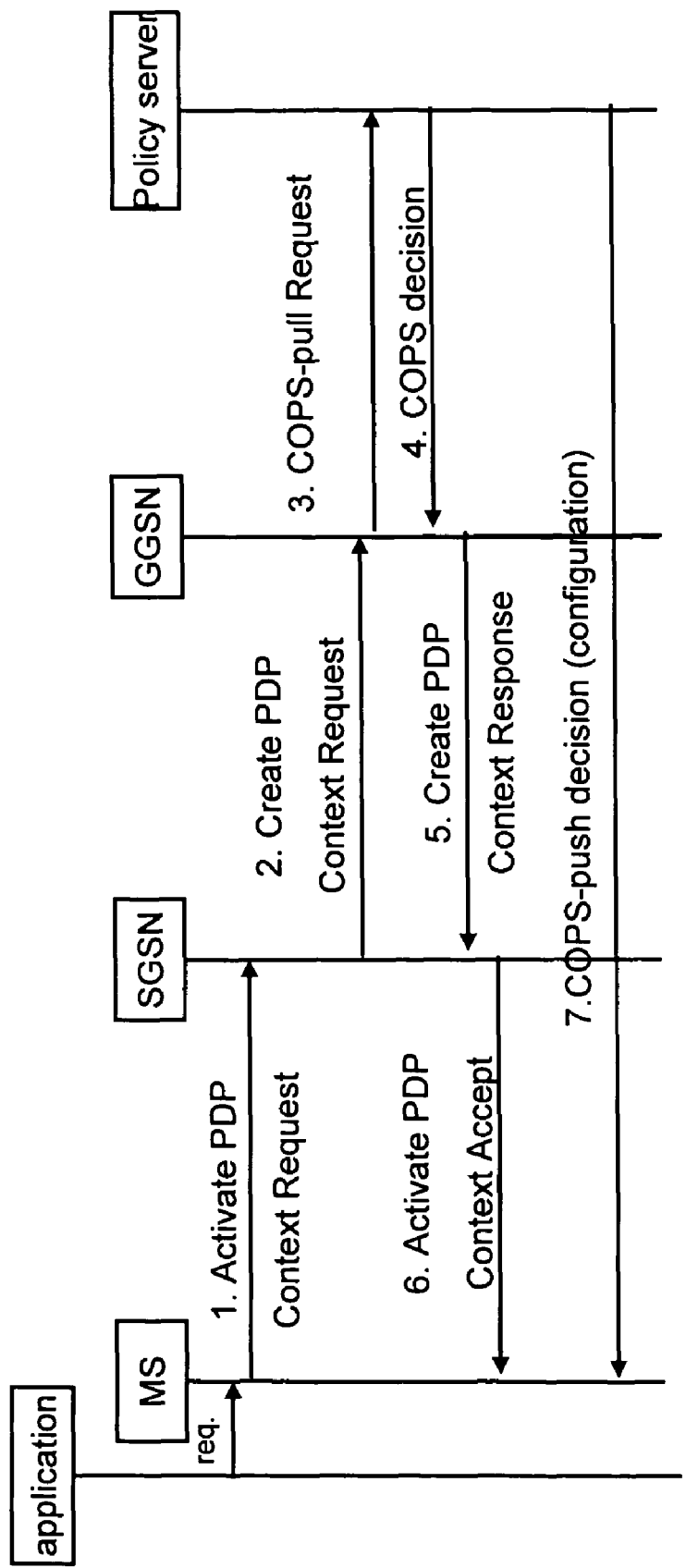
FIG. 3 shows a system where a policy server uses COPS to dynamically configure the user equipment.
Figure 4:
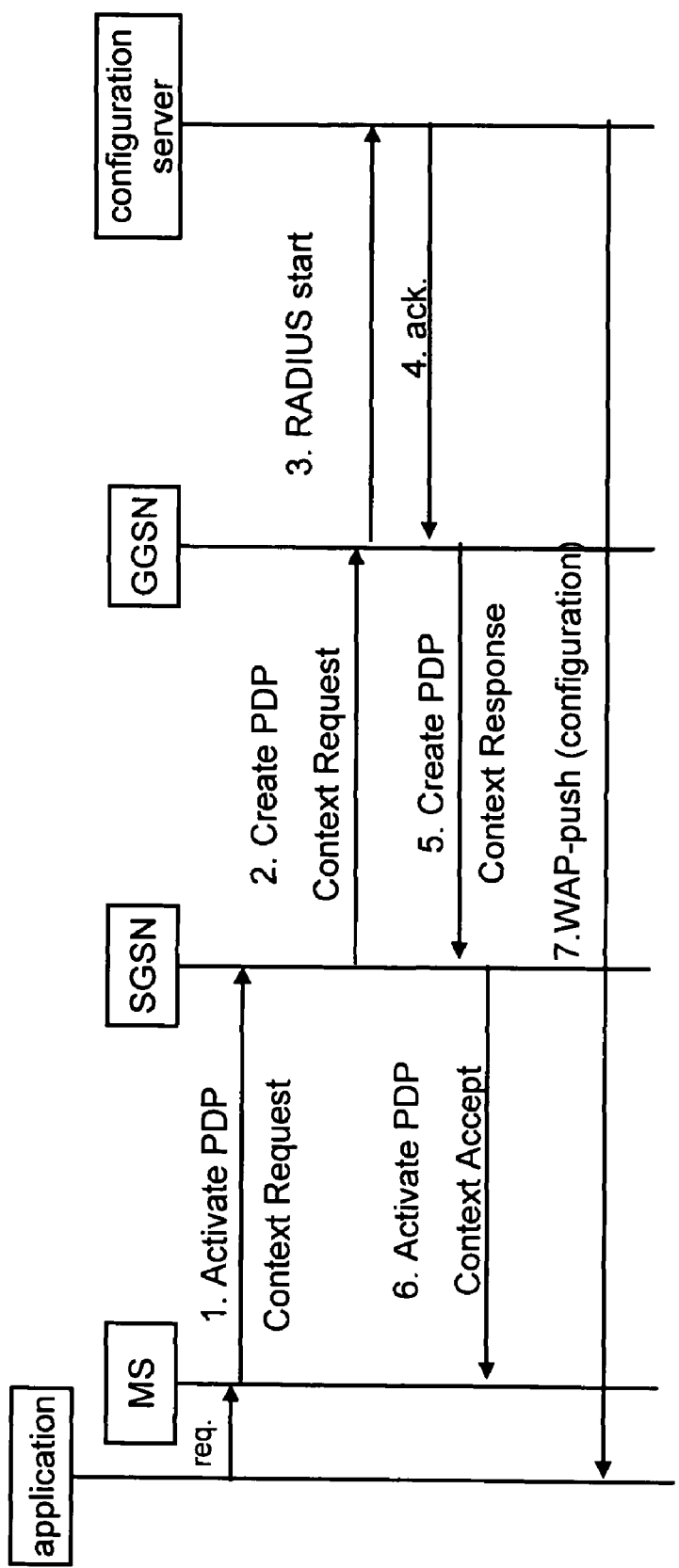
FIG. 4 shows a system where a configuration server uses WAP to dynamically configure the MS.

A different signaling flow showing how to configure the Mobile Station is depicted in FIGS. 3 and 4.

FIG. 3 shows a PDP context activation where the GGSN checks the authorization from a policy server using a COPS-pull request (communication 3 in FIG. 3). The COPS-pull request contains user identity, user IP address, QoS requested, TFT, authorization token, an indication of intended use of the PDP context if available (e.g. signaling PDP context), MS capability and other relevant-parameters. If the policy server authorizes the PDP context, the policy server sends a COPS decision to the GGSN (communication 4 in FIG. 3) and may further send configuration information directly to the MS using COPS-push (communication 7 in FIG. 3). This configuration information contains a list of filter(s), and associated with every filter: Diffserv marking, UMTS QoS profile, TFT and APN. In addition, an application server IP address to be used by different applications may be sent. Note that APN may be-set to wild card to indicate that any APN would be acceptable. This information is not limited to the configuration information needed by one application, but may cover all applications for which the MS has rights and capabilities to handle. The capabilities are deduced from a new information element "MS capability" which is an addition to existing PDP context activation procedure proposed in this application. "MS capability" covers QoS support (maximum bit rate supported by the MS; list of traffic classes supported) and list of applications installed in the MS. This information will be received by the MS.

The application server IP address (such as WAP Gateway address currently hard-coded) may then be dynamically set in the MS.

In a first embodiment, the case in which an application is not configurable by the MS, i.e. typically implemented on a separate device, is described.

According to the first embodiment, the MS behaves in the following way. If an uplink packet is received by the MS, the MS will first check it against the filter (e.g. UDP port 8080). The filter indicates to the MS with which Diffserv codepoints this uplink packet is to be marked and with which UMTS QoS profile it should be sent over the radio. The MS will then check whether a suitable PDP context exists (similar QoS and same PDP type, acceptable APN) to send the packet directly. If such a PDP context is found the packet is sent in this PDP context. If no suitable PDP context exists, the MS will activate a suitable PDP context. After the PDP context activation, the packet will be sent in this PDP context. The PDP context may be deleted after no traffic has been sent during a certain time.

In a second embodiment, the case in which an application is configurable by the MS, i.e. typically implemented in the MS, is described.

According to the second embodiment, the MS uses the configuration information received in communication 7 in FIG. 3 to configure the application. The application properly marks the IP packet based on the marking information sent in the COPS-push message. If the application needs to send a packet, it first requests a PDP context activation with appropriate QoS, appropriate APN, and appropriate TFT.

FIG. 4 shows a system where a configuration server uses WAP-(Wireless Application Protocol)push to dynamically configure the application in the MS. WAP-Push includes in its addressing the application ID, and therefore is well suited to address an application directly.

When a PDP context is created, the GGSN sends to a configuration server a RADIUS start accounting message (communication 3 in FIG. 4) containing user identity (e.g. IMSI, MSISDN), user IP address, QoS requested, an indication of intended use of the PDP context if available (e.g. signaling PDP context), MS capability and other relevant parameters. When the PDP context will be deactivated a RADIUS stop accounting message is also sent to the configuration server. Therefore the configuration server is aware whether the MS is connected or not.

The configuration server sends an acknowledge message to the GGSN (communication 4 in FIG. 4) and further sends a WAP-push message directly to the application(s) it needs to configure (communication 7 in FIG. 4). This message contains configuration information such as filter (mapping for uplink), Diffserv marking, UMTS QoS profile, TFT (mapping for downlink), APN and application server IP address to be used by this application.

While the invention has been described with reference to preferred embodiments, the description is illustrative of the invention and is not to be construed as limiting the invention. Various modifications and applications may occur to those skilled in the art without departing from the true spirit and scope of the invention as defined by the appended claims.

The invention claimed is:

1. A system, comprising:
a subscriber equipment configured to initiate applications with associated quality of service flows in a multi-session connection;
a configuration device configured to obtain, for each of said initiated applications, type of service settings of a network node hosting the initiated application, to track, for each of said initiated applications, the type of service settings, and to provide configuration information based on the type of service settings to the subscriber equipment in a packet data protocol context activation procedure for the initiated application, the configuration device being configured to send the configuration information as part of a specific message to the subscriber equipment, the configuration information being used to map uplink/downlink packet data for the initiated application to a packet data protocol context; and
a gateway node configured to exchange packets between a packet data network system and the subscriber equipment, wherein
the subscriber equipment is configured to provide the gateway node with the configuration information, and
the gateway node is configured to route the packets in accordance with the configuration information.

2. The system according to claim 1, wherein the configuration device is further configured to derive the configuration information based on the operator policy.

3. The system according to claim 1, wherein
the configuration device is further configured to obtain settings of the subscriber equipment for each of said initiated applications and to provide said configuration information based on these settings to the subscriber equipment, and
the subscriber equipment is configured to transmit packets to the network system for each of said initiated applications in accordance with the configuration information.

4. The system according to claim 1, wherein the settings of the network node hosting the application are determined by an operator of the network node.

5. The system according to claim 1, wherein, in case the gateway node is configured to route the packets based on the settings of the hosting network node, the configuration device is configured to provide the configuration information to the subscriber equipment over a single-session connection from the subscriber equipment to the hosting network node.

6. The system according to claim 1, further comprising:
an edge network node configured to change the settings of a hosting network node, wherein
the configuration device is configured to obtain settings of the edge network node and to provide the configuration information based on the edge network node settings.

7. The apparatus of claim 1, wherein the configuration information includes quality of service parameters defining the quality of service flow for the uplink and the downlink and parameters used by the initiated application.

8. An apparatus, comprising:
a receiver configured to obtain, for each application initiated by a subscriber equipment with an associated quality of service flow in a multi-session connection, type of service settings of a network node hosting the application;
a processor configured to track, for each of the initiated applications, the type of service settings and to derive configuration information based on the type of service setting; and
a transmitter configured to provide the configuration information based on the type of service settings to the subscriber equipment in a packet data protocol context activation procedure for the initiated application, wherein the configuration information enables subscriber equipment to map uplink/downlink packet data for the initiated application to a packet data protocol context.

9. The apparatus according to claim 8, further comprising a deriver configured to derive the configuration information based on the operator policy.

10. The apparatus according to claim 8, further comprising:
a setting information transceiver configured to receive settings of the subscriber equipment for said each initiated application and to provide configuration information based on the settings to the subscriber equipment for enabling the subscriber equipment to transmit packets to the network system for said each initiated application in accordance with the configuration information.

11. The apparatus according to claim 8, wherein, in case a gateway node is configured to route packets based on the settings of the hosting network node, the apparatus comprises additional providing means for providing configuration information to the subscriber equipment over a single-session connection from the subscriber equipment to the hosting network node.

12. The apparatus according to claim 8, further comprising:
a setting information transceiver configured to receive settings of an edge network node capable of changing the settings of a hosting network node, and to provide said configuration information based on the edge network node settings.

13. The apparatus according to claim 8, wherein the configuration information comprises quality of service parameters defining a quality of service flow.

14. The apparatus according to claim 8, wherein the configuration information comprises filters for uplink and downlink.

15. The apparatus according to claim 8, wherein the configuration information comprises parameters to be used by one or more of the applications.

16. The apparatus according to claim 8, wherein the settings comprise type of service information.

17. The apparatus according to claim 8, wherein a needed quality of service flow is directly determined by the application.

18. A method, comprising:
   obtaining, for each application initiated by a subscriber equipment with an associated quality of service flow in a multi-session connection, type of service settings of a network node hosting the initiated application;
   tracking, for each of said initiated applications, the type of service settings;
   providing configuration information based on the type of service settings to the subscriber equipment in a packet data protocol context activation procedure, the providing comprising sending the configuration information as part of a specific message to the subscriber equipment, the configuration information being used to map uplink/downlink packet data to a packet data protocol context;
   providing, using the subscriber equipment, a gateway node configured to exchange packets between a network system and the subscriber equipment with the configuration information; and
   routing the packets in accordance with the configuration information.

19. The method according to claim 18, wherein the configuration information comprises quality of service parameters defining a quality of service flow.

20. The method according to claim 18, wherein the configuration information comprises filters for uplink and downlink.

21. The method according to claim 18, wherein the configuration information comprises parameters to be used by one or more of the applications.

22. The method according to claim 18, wherein the settings comprise type of service information.

23. The method according to claim 18, wherein a needed quality of service flow is directly determined by the application.

24. The method according to claim 18, wherein the settings of an application are fixed.

25. The method according to claim 18, wherein the settings of an application are determined by an operator.

26. The method according to claim 18, further comprising:
   obtaining settings of the subscriber equipment for said each initiated application and providing said configuration information based on the settings to the subscriber equipment, and wherein packets are transmitted from the subscriber equipment to the network system for said each initiated application in accordance with the configuration information.

27. An apparatus, comprising:
   obtaining means for obtaining, for each application initiated by a subscriber equipment with an associated quality of service flow in a multi-session connection, type of service settings of a network node hosting the initiated application; and
   providing means for providing configuration information based on the type of service settings to the subscriber equipment in a packet data protocol context activation procedure, for tracking, for each of said initiated applications, the type of service settings, and for enabling the subscriber equipment to map type of service setting information to the associated quality of service flow, the providing means further comprising sending means for sending the configuration information as part of a specific message to the subscriber equipment, the configuration information being used to map uplink/downlink packet data to a packet data protocol context.

28. A computer program embodied on a computer readable medium, said computer program configured to control a processor to perform:
   obtaining, for each application initiated by a subscriber equipment with an associated quality of service flow in a multi-session connection, type of service settings of a network node hosting the initiated application;
   tracking, for each of said initiated applications, the type of service settings;
   providing configuration information based on the type of service settings to the subscriber equipment in a packet data protocol context activation procedure, the providing comprising sending the configuration information as part of a specific message to the subscriber equipment, the configuration information being used to map uplink/downlink packet data to a packet data protocol context; and
   wherein the configuration information is exchanged between the subscriber equipment and a gateway for routing the packets in accordance with the configuration information.

* * * * *